United States Patent
Kleinschmidt et al.

(10) Patent No.: US 12,476,441 B2
(45) Date of Patent: Nov. 18, 2025

(54) ARRANGEMENT OF A CURRENT TRANSFORMER CORE AT AN INTERFACE WITH A CONICAL CONNECTOR

(71) Applicant: SIEMENS ENERGY GLOBAL GMBH & CO. KG, Munich (DE)

(72) Inventors: Andreas Kleinschmidt, Oranienburg (DE); Stefan Beutel, Berlin (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 148 days.

(21) Appl. No.: 18/225,806

(22) Filed: Jul. 25, 2023

(65) Prior Publication Data
US 2024/0072521 A1  Feb. 29, 2024

Related U.S. Application Data

(60) Provisional application No. 63/400,494, filed on Aug. 24, 2022.

(51) Int. Cl.
*H02B 13/035* (2006.01)

(52) U.S. Cl.
CPC ..... *H02B 13/0356* (2013.01); *H02B 13/0352* (2013.01)

(58) Field of Classification Search
CPC ........ H02B 13/00–08; H01F 2038/305; H02G 5/068
See application file for complete search history.

(56) References Cited

U.S. PATENT DOCUMENTS

| | | | | |
|---|---|---|---|---|
| 3,793,562 A | * | 2/1974 | Cleaveland | H02B 11/167 361/678 |
| 3,921,113 A | * | 11/1975 | Schiemann | H01F 38/30 336/84 R |
| 3,942,099 A | * | 3/1976 | Freygang | G01R 15/14 336/174 |
| 4,241,373 A | * | 12/1980 | Mara | G01R 15/142 324/133 |
| 4,471,333 A | * | 9/1984 | Stephanides | H01F 38/30 336/84 R |
| 5,257,161 A | * | 10/1993 | Ocerin | H02B 13/005 361/605 |
| 5,774,035 A | * | 6/1998 | Lee | H01F 38/30 174/152 R |
| 6,016,247 A | | 1/2000 | Dams et al. | |
| 6,242,708 B1 | * | 6/2001 | Marchand | H01H 33/6661 218/153 |

(Continued)

FOREIGN PATENT DOCUMENTS

| | | | | |
|---|---|---|---|---|
| CN | 118800530 A | * | 10/2024 | H01F 27/06 |
| DE | 102012215246 A1 | * | 3/2014 | H02B 13/0358 |

(Continued)

*Primary Examiner* — Robert J Hoffberg

(57) ABSTRACT

A current transformer arrangement for a gas-insulated switchgear is provided. The current transformer arrangement includes an adapter having a housing, the housing defining a first end connection opening, a second end connection opening and a hollow interior, a current conductor passing through the hollow interior of the adapter, and an annular current transformer core surrounding an exterior of the housing for measuring a current of the current conductor.

8 Claims, 4 Drawing Sheets

(56) References Cited

U.S. PATENT DOCUMENTS

| | | | | |
|---|---|---|---|---|
| 6,362,445 | B1 * | 3/2002 | Marchand | H02B 13/0354 |
| | | | | 218/155 |
| 6,373,015 | B1 * | 4/2002 | Marchand | H02B 13/0354 |
| | | | | 218/139 |
| 6,419,512 | B2 * | 7/2002 | Starck | H02B 13/005 |
| | | | | 439/278 |
| 6,897,396 | B2 * | 5/2005 | Ito | H02B 1/56 |
| | | | | 218/120 |
| 7,384,287 | B2 * | 6/2008 | Hughes | H01H 9/085 |
| | | | | 439/181 |
| 8,410,890 | B2 * | 4/2013 | Fisher | H01F 38/30 |
| | | | | 439/805 |
| 9,843,170 | B2 * | 12/2017 | Waynick, Sr. | H01H 71/0207 |
| 9,906,008 | B2 * | 2/2018 | Yoshida | H02G 5/007 |
| 10,297,987 | B2 * | 5/2019 | Yoshida | H02B 13/0354 |
| 11,476,645 | B2 * | 10/2022 | Kawanishi | H02B 1/20 |
| 2001/0002666 | A1 * | 6/2001 | Ito | H02B 1/56 |
| | | | | 218/139 |
| 2016/0294174 | A1 | 10/2016 | Yoshida et al. | |
| 2020/0328580 | A1 * | 10/2020 | Inoue | H02B 1/20 |

FOREIGN PATENT DOCUMENTS

| | | | | |
|---|---|---|---|---|
| EP | 0803142 | B1 * | 12/1998 | H02B 13/045 |
| EP | 1569311 | A1 * | 8/2005 | H01F 38/30 |
| EP | 3001521 | A1 | 3/2016 | |
| JP | 2012200143 | A * | 10/2012 | H02B 13/055 |
| WO | WO-2014032943 | A1 * | 3/2014 | H02B 13/0358 |
| WO | 2015076029 | A1 | 5/2015 | |

* cited by examiner

ARRANGEMENT OF A CURRENT TRANSFORMER CORE AT AN INTERFACE WITH A CONICAL CONNECTOR

BACKGROUND

Gas insulated switchgear (GIS) typically include an encapsulated vessel filled with a pressurized insulating gas. The pressurized vessel encloses a switch panel which includes components such as a circuit breaker cable sealing, and a conductor(s) arranged and enclosed within the pressurized vessel. A current/voltage transformer detects an electrical current and/or an electrical voltage, respectively, within high voltage cables connected to the gas insulated switchgear. The GIS is an important part of an electrical grid and is mainly located in areas with limited space. The connection with the grid is usually made via bushings or cables.

Conventionally, the GIS switchgear has a closed core current transformer which is arranged for protection purposes around the high voltage cables before the plug-in connector of the cables to the switchgear, external to the encapsulate vessel. The installation of these current transformers is time-consuming and has to be done before or during the installation of the high-voltage cables. Open current transformer cores are split in to portions and are easier to install, however, these are more expensive, require larger installation space and also allow installation after the cable assembly.

BRIEF SUMMARY

A current transformer arrangement for a gas-insulated switchgear includes an adapter having a housing, the housing defining a first end connection opening, a second end connection opening and a hollow interior, a current conductor passing through the hollow interior of the adapter, and an annular current transformer core surrounding an exterior of the housing for measuring a current of the current conductor.

In another construction, a current transformer arrangement for a gas-insulated switchgear includes an adapter having a housing, the housing defining a first end connection opening, a second end connection opening and a hollow interior, a current conductor passing through the hollow interior of the adapter, a connector disposed between the adapter and the gas insulated switchgear, the connector having a second housing having a first conical portion that is positioned within the gas insulated switchgear and a second conical portion positioned exterior to the gas insulated switchgear within the first end connection opening of the adapter, and an annular current transformer core surrounding an exterior of the housing for measuring a current of the current conductor.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The present application relates to an arrangement for measuring currents at an interface. The arrangement includes a current transformer core arranged around an adapter at an interface with a connector. The arrangement may be used to measure the current flowing through a current conductor.

Figure 1:
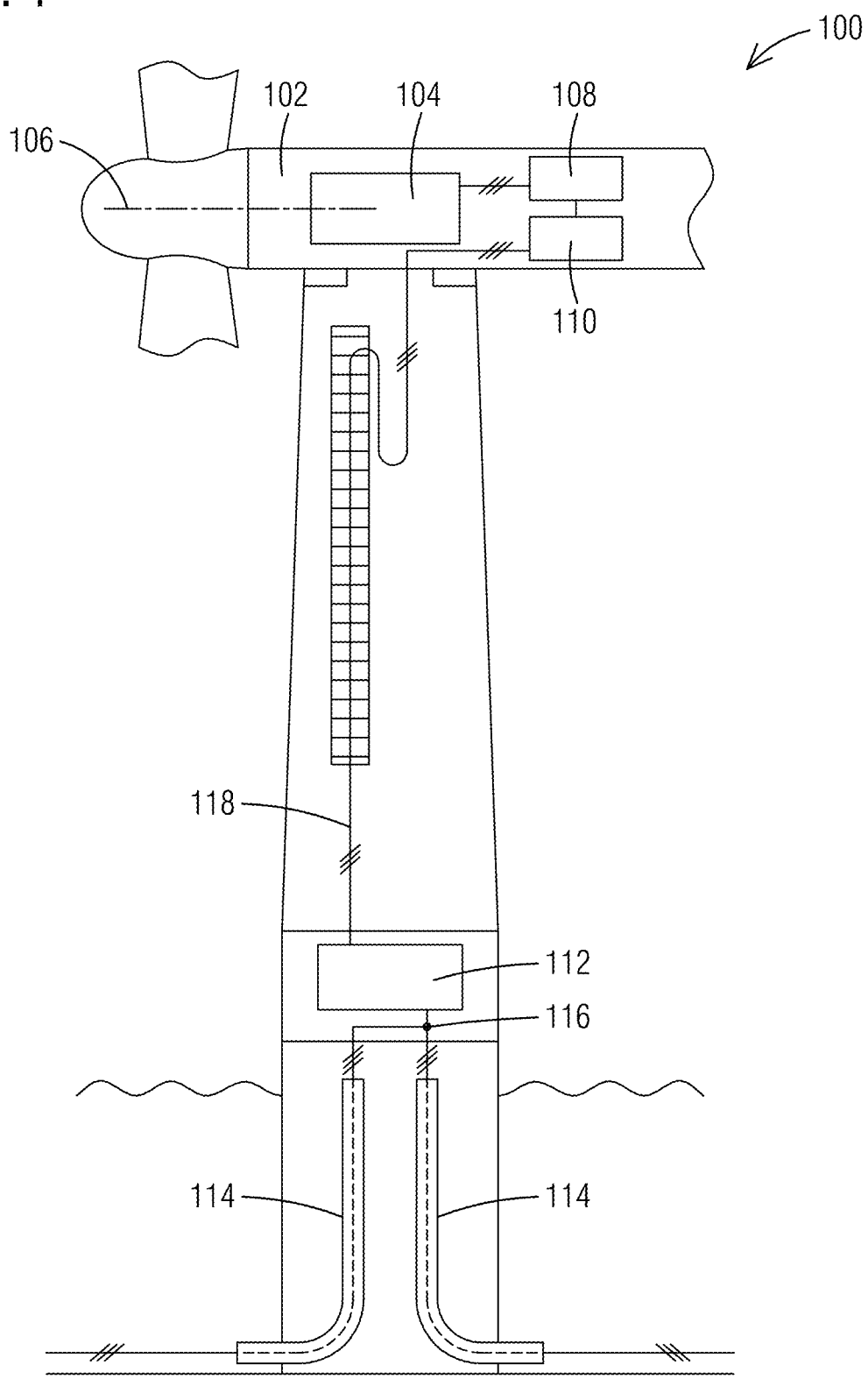
FIG. 1 illustrates a sectional view of a windtower.

FIG. 1 is a sectional view of a windtower 100 which includes a tower resting on a base. At one end of the tower opposite the base is a nacelle 102 which supports a rotor 106. The rotor 106 is connected to a generator 104 which converts the movement of the rotor 106 into variable frequency electrical energy. The generator 104 is connected to an inverter 108 and a transformer 110 so that the electrical energy from the generator 104 can be converted into a standard value, for example 60 Hz in the United States, via the inverter 108 and the transformer 110. The transformer 110 transforms the inverted energy into a suitable voltage level, for example, 960 VAC-6600 VAC. The generator 104 is connected via a first cable connection 118 to a pressurized gas insulated switchgear 112. In the illustrated view of FIG. 1, the gas insulated switchgear 112 is depicted in this case as a component of a windtower 100, this is for illustrative purposes only. The gas insulated switchgear 112 may be utilized in other applications as well such as transmission stations onshore. A second cable connection 114, or high voltage cable connection, connects the gas insulated switchgear to an electrical energy transmission network (not shown). In the shown embodiment, the second cable connection 114 includes a node 116 that branches into two cables traveling parallel to one another.

Figure 2:
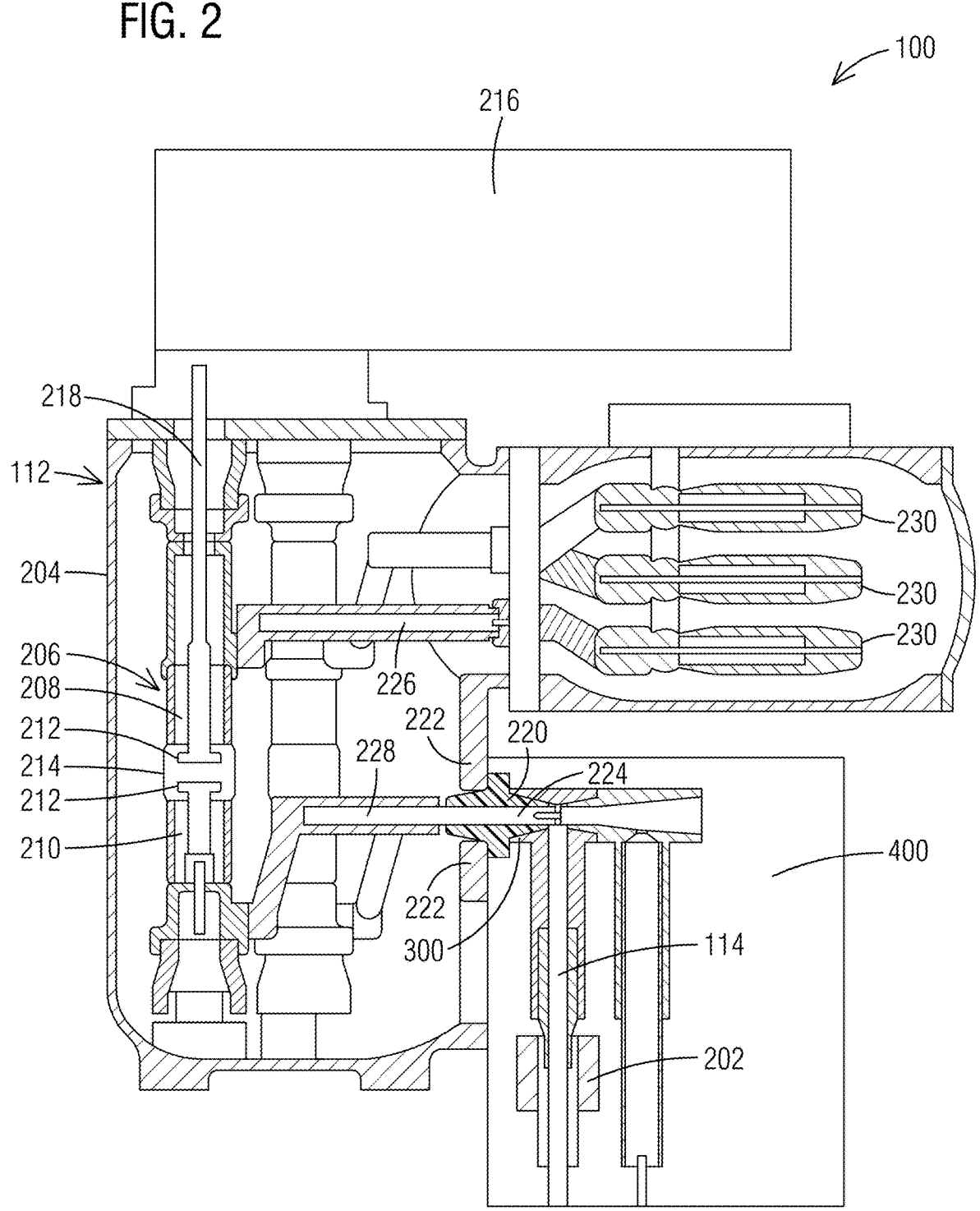
FIG. 2 illustrates a partial sectional view of the windtower of FIG. 1 with a gas insulated switchgear and a conventional current transformer.

FIG. 2 is a partial sectional view of components of the windtower 100 shown in FIG. 1. The gas insulated switchgear 112 is shown in FIG. 2 with more detail. The gas insulated switchgear 112 includes a pressurized container 204. The pressurized container 204 may comprise a metal, such as aluminum, and may include a hollow cylindrical structure closed at each end in a fluid tight manner. The interior of the pressurized container 204 is filled with a fluid that is pressurized to a pressure higher than that of the pressure of the medium surrounding the pressurized container 204 so that the components located within the interior are electrically insulated. The pressurized fluid may be sulfur hexafluoride gas or clean air.

The gas insulated switchgear 112 also includes a switching device 206. The switching device 206 may be a multi-phase design, where the switching paths of the individual phases may be a similar design. One phase of the switching device 206 is shown in FIG. 2 for simplicity purposes only. Each phase of the switching device 206 includes a contact making first side 208 and contact making second side 210. Switching contact pieces 212 which are movable relative to one another are arranged between the first side 208 and the second side 210. The first side 208 and the second side 210 are connected by an electrically insulating spacer 214.

A drive device 216 arranged exterior to the gas insulated switchgear 112 is utilized to move the switching contact pieces 212 relative to one another via a drive rod 218 guided through the housing of the pressurized container 204 in a fluid-tight manner. Connecting conductors 226 connect the first side 208 to output lines 230 exterior to the pressurized container 204. A grounding switch arranged in the interior of the gas insulated switchgear 112 may be utilized to ground the first side 208 of the switching device 206.

A connector 220 including a housing may be used to incorporate the switching device 206 into a current path. A current conductor 224 passes through a hollow interior of the housing. The current conductor 224 may be a three phase conductor, conducting the three phases through the pressurized container 204 via conducting conductors 228 to the second side 210 of the switching device 206. The connector 220 provides a point at which to connect the second cable connection 114 carrying current conductors with the second side 210.

FIG. 2 also includes a conventional current transformer 202 disposed around and concentric to the second cable connection 114. Current transformers are typically used to perform current measurements on the phase conductors when a direct current measurement may be difficult to obtain. In order to install this conventional current transformer 202, the second cable connection 114 has to pass through the current transformer 202.

The inventors have recognized that a current transformer core may be arranged at an interface with the connector 220 in order to more easily measure the current passing through a current conductor at the interface.

Figure 3:
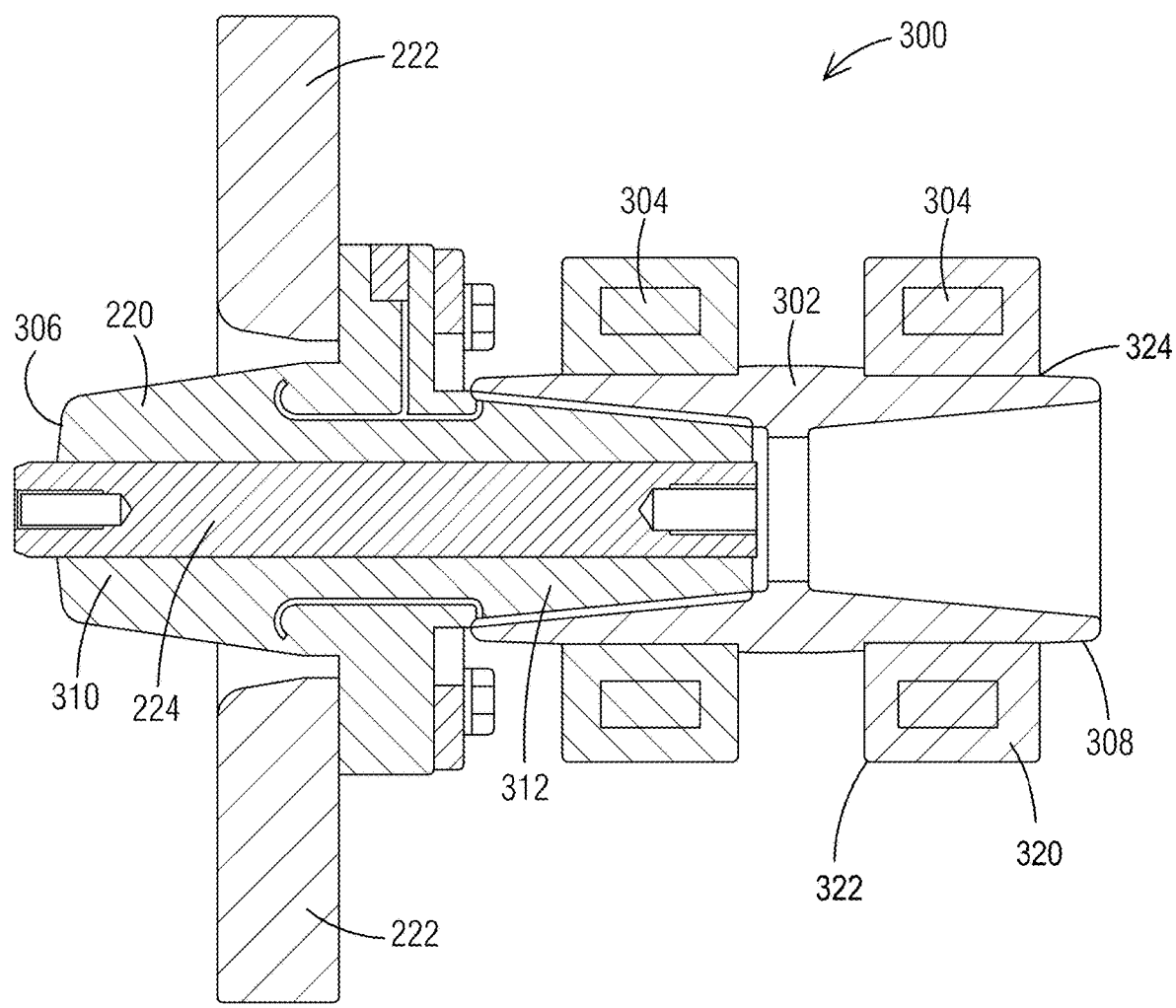
FIG. 3 illustrates a sectional view of a current transformer arrangement.

FIG. 3 illustrates a sectional view of the current transformer arrangement 300. In the shown embodiment, the current transformer arrangement 300 includes the connector 220, as shown in FIG. 2, an adapter 302 attached to a conical portion of the connector 220, and at least one current transformer core 304. The connector 220 includes a connector housing 306 comprising a resin body that defines a hollow interior. A material of the connector housing 306 includes an electrical insulating material. A current conductor 224 passes through the hollow interior of the connector housing 306. The connector housing 306 includes a first conical portion 310 and a second conical portion 312. The first conical portion 310 is positioned within the interior of the gas insulated switchgear 112 and passes through the flange cover 222 of the pressurized container 204 with the conical shape improving the fluid tight seal that maintains the pressurized fluid.

The adapter 302 is utilized as a conduit to which components carrying current conductors, such as angled plug-in connectors, may be attached. The adapter 302 includes an adapter housing 308 defining a hollow interior which in FIG. 3 includes a first end connection opening on a first end and a second end connection opening on a second end. In order to detect and measure a flow of current through the current conductors positioned within the adapter 302, annular current transformer cores 304 are fitted to surround the adapter 302.

In FIG. 3, there are two current transformers 322 each with transformer cores 304 and secondary windings 320, however, the number of current transformers 322 may vary such as in a range of 1-3 current transformers 322, each with corresponding secondary windings 320 and transformer cores 304. The secondary windings 320 surround the adapter housing 308 and are supported by it. The current transformer cores 304 can detect currents flowing through a cable carrying current conductors positioned in the hollow interior of the adapter 302 in the rated current range or in the overcurrent range. The current conductor(s) pass through the secondary windings 320 of the current transformer 322 which serve as a primary winding. The current transformer core 304 comprises a ferromagnetic material and the secondary windings 320 may comprise copper. In an embodiment, the current transformers 322 are attached to the adapter 302 via an insulating adhesive 324.

Figure 4:
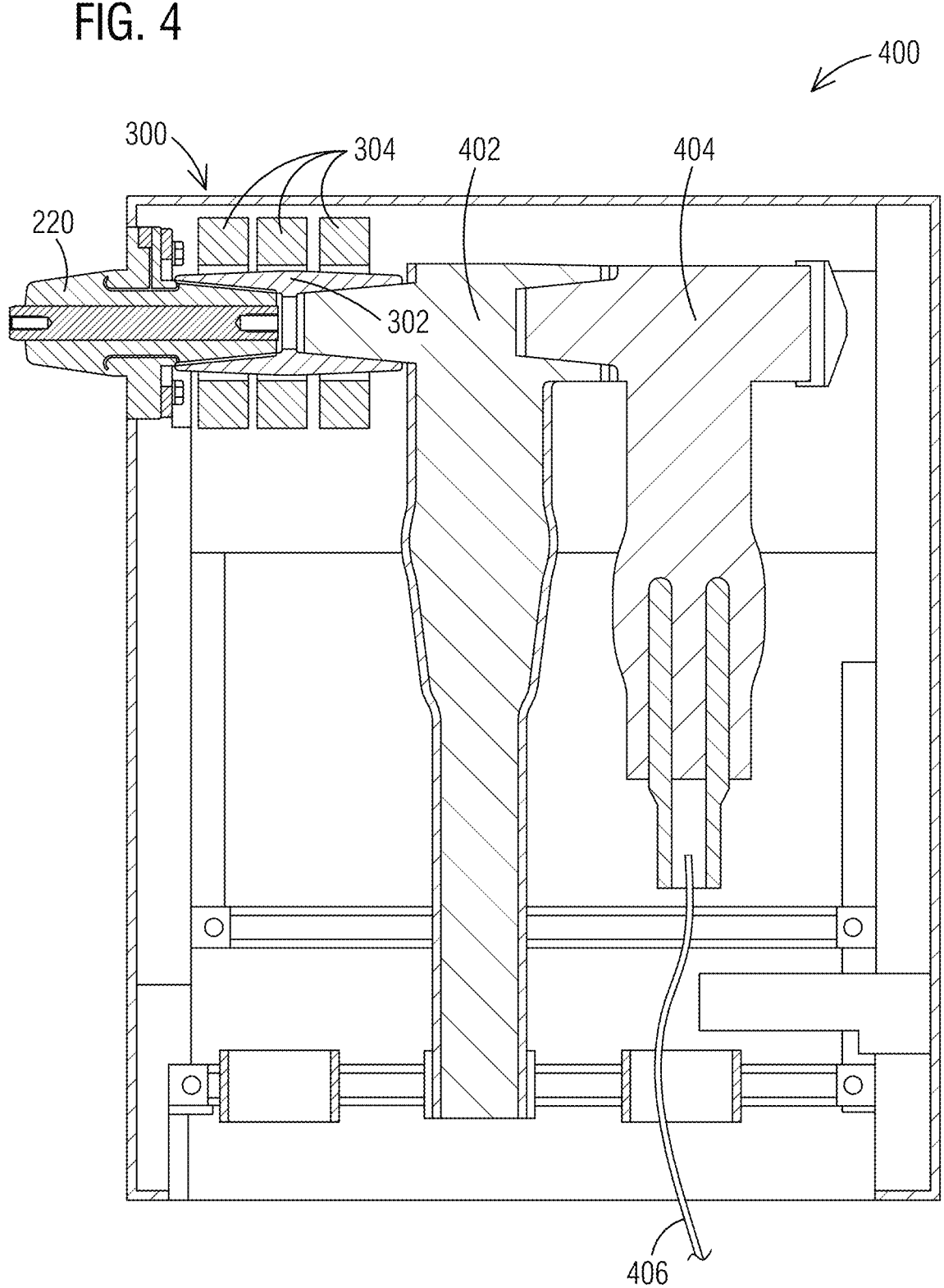
FIG. 4 illustrates a further sectional view of the current transformer arrangement.

FIG. 4 illustrates a further sectional view of the current transformer arrangement 300 inside a branching box 400. The branching box 400 may be used to create the node 116 in the windtower 100. In the embodiment shown in FIG. 4, as compared with FIG. 2 where the second cable connection 114 carries current conductor(s) and has a current transformer 202 positioned around the second cable connection 114, the current transformer cores 304 are positioned around an adapter 302 component attached to the connector 220. Plug in connectors may be attached to the adapter 302 via its second connection opening. In the embodiment of FIG. 4, a first plug in connector 402, an arrester, may be used to terminate the voltage/current to the gas insulated switchgear 112 if an overvoltage is detected. A cable plug 404 may carry a cable connection 406, the cable connection 406 carrying current conductors connected to the gas insulated switchgear 112 via the current transformer arrangement 300 to the grid.

In operation, the current conductor cores may be installed on a component such as an adapter by fixing the annular current conductor cores to the exterior of the adapter housing via an insulating adhesive. This may be pre-installed and routine tested in a factory before connection to the connector and the gas insulated switchgear.

What is claimed is:

1. A current transformer arrangement for a gas insulated switchgear device, comprising:
   an adapter for connection to the gas insulated switchgear device, the adapter having a first housing, the first housing defining a first inner conical end connection opening, a second inner conical end connection opening, and an interior passage extending between the first conical end connection opening and the second conical end connection opening;
   a connector disposed between the adapter and the gas insulated switchgear device, the connector having a second housing, the second housing having a first outer conical portion that is positioned within the gas-insulated switchgear device and a second outer conical portion positioned exterior to the gas insulated switchgear device positioned within the first end connection opening of the adapter, and a conductor passing through the connector from the first outer conical portion to the second outer conical portion; and
   at least one annular current transformer for measuring a current of the current conductor, the at least one annular current transformer comprising an annular current transformer core and a secondary winding,
   wherein the secondary winding of the at least one annular current transformer surrounding an exterior of the first housing of the adapter, the second outer conical portion of the connector within the first inner conical end connection opening of the first housing of the adapter, and the current conductor passing through second outer conical portion of the connector, and
   wherein the at least one annular current transformer is attached to the exterior of the first housing of the adapter by an insulating adhesive.

2. The current transformer arrangement of claim 1, wherein the at least one annular current transformer further comprises a plurality of annular current transformers each surrounding the exterior of the first housing of the adapter and having the annular current transformer core and the secondary winding, a number of the plurality of annular current transformers is in a range of 2-3, at least one of the plurality of annular current transformers surrounds the second outer conical portion of the connector and the current conductor.

3. The current transformer arrangement of claim 1, further comprising an arrester component including an outer conical end that is positioned within the second interior conical end connection opening of the first housing of the adapter.

4. The current transformer arrangement of claim 2, wherein at least one of the plurality of current transformers is located at a side of the first interior conical end connection opening of the first housing of the adapter, and at least another one of the plurality of current transformer is located on a side of second interior conical end connection opening of the first housing of the adapter.

5. A windtower including a current transformer arrangement for a gas insulated switchgear device, comprising:
   an adapter for connection to the gas insulated switchgear device, the adapter having a first housing, the first housing defining a first inner conical end connection opening, a second inner conical end connection opening, and an interior passage extending between the first conical end connection opening and the second conical end connection opening;
   a connector disposed between the adapter and the gas insulated switchgear device, the connector having a second housing, the second housing having a first outer conical portion that is positioned within the gas-insulated switchgear device and a second outer conical portion positioned exterior to the gas insulated switchgear device positioned within the first end connection opening of the adapter, and a conductor passing through the connector from the first outer conical portion to the second outer conical portion; and
   at least one annular current transformer for measuring a current of the current conductor, the at least one annular current transformer comprising an annular current transformer core and a secondary winding,
   wherein the secondary winding of the at least one annular current transformer surrounding an exterior of the first housing of the adapter, the second outer conical portion of the connector within the first inner conical end connection opening of the first housing of the adapter, and the current conductor passing through second outer conical portion of the connector, and
   wherein the at least one annular current transformer is attached to the exterior of the first housing of the adapter by an insulating adhesive.

6. The windtower of claim 5, wherein the at least one annular current transformer further comprising a plurality of annular current transformers each surrounding the exterior of the first housing of the adapter and having the annular current transformer core and the secondary winding, a number of the plurality of annular current transformers is in a range of 2-3.

7. The windtower of claim 6, wherein at least one of the plurality of current transformers surrounds a first inner conical end connection opening side of the first housing of the adapter, and at least another one of the plurality of current transformer surrounds a second inner conical end connection opening side of the first housing of the adapter and the current conductor.

8. The windtower of claim 5, further comprising an arrester component including an outer conical end that is positioned within the second interior conical end connection opening of the first housing of the adapter.

* * * * *